United States Patent [19]

Chang

[11] 4,402,570

[45] Sep. 6, 1983

[54] TRIPLE MINIMUM DISPERSION WAVELENGTHS FOR A HIGH NA SINGLE-MODE STEP-INDEX FIBER

[75] Inventor: Ching T. Chang, San Diego, Calif.

[73] Assignee: The United States of America as represented by the Secretary of the Navy, Washington, D.C.

[21] Appl. No.: 253,622

[22] Filed: Apr. 13, 1981

[51] Int. Cl.³ .............................................. G02B 5/14
[52] U.S. Cl. .................................. 350/96.30; 65/3.11
[58] Field of Search .......................... 350/96.30, 96.31; 65/3.11

[56] References Cited

U.S. PATENT DOCUMENTS

| | | | |
|---|---|---|---|
| 3,646,462 | 2/1972 | Snitzer | 350/96.30 |
| 3,806,224 | 4/1974 | MacChesney et al. | 350/96.30 |
| 3,823,997 | 7/1974 | Gloge et al. | 350/96.30 |
| 3,901,674 | 8/1975 | Strack et al. | 65/3.11 |
| 3,902,879 | 9/1975 | Siegmund | 65/3.11 |
| 3,966,300 | 6/1976 | Bernsee | 350/96.30 |
| 4,002,512 | 1/1977 | Lim | 350/96.30 |
| 4,089,586 | 5/1978 | French et at. | 350/96.30 |
| 4,205,900 | 6/1980 | Eve | 350/96.30 |
| 4,300,930 | 11/1981 | Chang | 350/96.30 |

*Primary Examiner*—David K. Moore
*Attorney, Agent, or Firm*—Robert F. Beers; Ervin F. Johnston; Thomas Glenn . Keough

[57] ABSTRACT

Single-mode, step-index optical fibers can be fabricated which enable the wideband long-distance duplex transmission of data at 1.3 μm and 1.55 μm, where attenuation and dispersion are both minimized. The appropriate index difference between the core and cladding materials and the dimensions of the core diameter are identified and selected to achieve minimum total dispersion at three discrete wavelengths in the single-mode, step-index fibers. The three minimum total dispersion wavelengths results from a cancellation between the material and waveguide dispersions which is owed to the proper selection of the parameters.

3 Claims, 6 Drawing Figures

RESULTS OF MINIMUM DISPERSION CALCULATIONS FOR SINGLE-MODE STEP-INDEX FIBERS
THE NOTATIONS T AND V REPRESENT THE SECOND ORDER RESIDUAL DISPERSION AND THE NORMALIZED FREQUENCY, AT THE MINIMUM DISPERSION WAVELENGTH $\lambda_o$, RESPECTIVELY

| STEP-INDEX FIBER | CORE DIAMETER 2a(μm) | RELATIVE INDEX DIFFERENCE Δ | MATERIAL COMPOSITION | MATERIAL DISPERSION | | TOTAL DISPERSION | | |
|---|---|---|---|---|---|---|---|---|
| | | | | $\lambda_o$ (μm) | [ps/(km·nm²)] | $\lambda_o$ (μm) | T [ps/(km·nm²)] | V |
| A | 3.708 | 2% | QUENCHED $SiO_2$ | 1.276 | 0.0125 | 1.535 | $1.962 \times 10^{-3}$ | 2.193 |
| B | 3.462 | 2.5% | QUENCHED $SiO_2$ | 1.276 | 0.0125 | 1.560 | $4.31 \times 10^{-4}$ | 2.195 |
| C | 3.290 | 3.0% | QUENCHED $SiO_2$ | 1.276 | 0.0125 | 1.436 | $1.215 \times 10^{-3}$ | 2.55 |
| | | | | | | 1.655 | $8.02 \times 10^{-4}$ | 2.21 |
| | | | | | | 2.343 | $2.48 \times 10^{-3}$ | 1.55 |
| D | 3.019 | 3.85% | QUENCHED $SiO_2$ | 1.276 | 0.0125 | 1.304 | $2.637 \times 10^{-3}$ | 2.92 |
| | | | | | | 1.551 | $1.844 \times 10^{-3}$ | 2.45 |
| | | | | | | 2.768 | $6.854 \times 10^{-3}$ | 1.35 |

FIG. 1

RESULTS OF MINIMUM DISPERSION CALCULATIONS FOR SINGLE-MODE STEP-INDEX FIBERS. THE NOTATIONS T AND V REPRESENT THE SECOND ORDER RESIDUAL DISPERSION AND THE NORMALIZED FREQUENCY, AT THE MINIMUM DISPERSION WAVELENGTH $\lambda_o$, RESPECTIVELY.

| STEP-INDEX FIBER | CORE DIAMETER $2a(\mu m)$ | RELATIVE INDEX DIFFERENCE $\Delta$ | MATERIAL COMPOSITION | MATERIAL DISPERSION $\lambda_o$ ($\mu m$) | MATERIAL DISPERSION [ps/(km·nm²)] | TOTAL DISPERSION $\lambda_o$ ($\mu m$) | TOTAL DISPERSION T [ps/(km·nm²)] | V |
|---|---|---|---|---|---|---|---|---|
| A | 3.708 | 2% | QUENCHED SiO₂ | 1.276 | 0.0125 | 1.535 | $1.962 \times 10^{-3}$ | 2.193 |
| B | 3.462 | 2.5% | QUENCHED SiO₂ | 1.276 | 0.0125 | 1.560 | $4.31 \times 10^{-4}$ | 2.195 |
| C | 3.290 | 3.0% | QUENCHED SiO₂ | 1.276 | 0.0125 | 1.436 | $1.215 \times 10^{-3}$ | 2.55 |
|   |   |   |   |   |   | 1.655 | $8.02 \times 10^{-4}$ | 2.21 |
|   |   |   |   |   |   | 2.343 | $2.48 \times 10^{-3}$ | 1.55 |
| D | 3.019 | 3.85% | QUENCHED SiO₂ | 1.276 | 0.0125 | 1.304 | $2.637 \times 10^{-3}$ | 2.92 |
|   |   |   |   |   |   | 1.551 | $1.844 \times 10^{-3}$ | 2.45 |
|   |   |   |   |   |   | 2.768 | $6.854 \times 10^{-3}$ | 1.35 |

FIG. 3
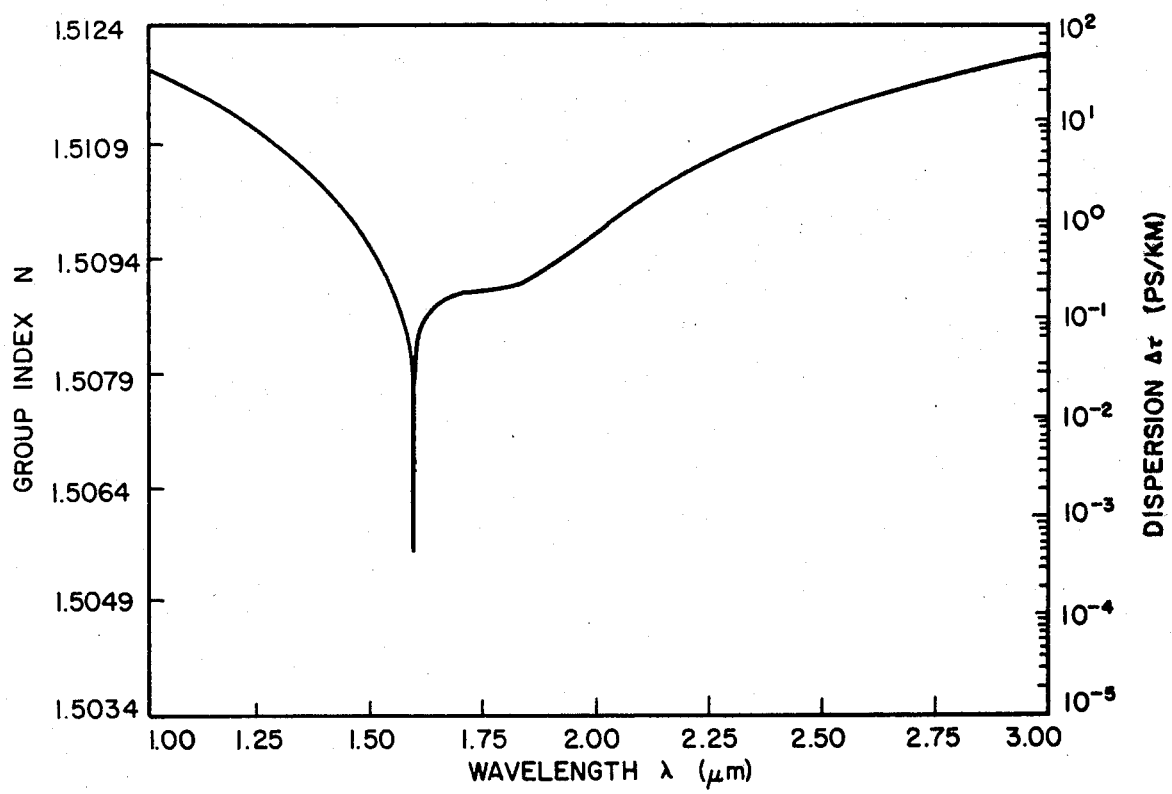
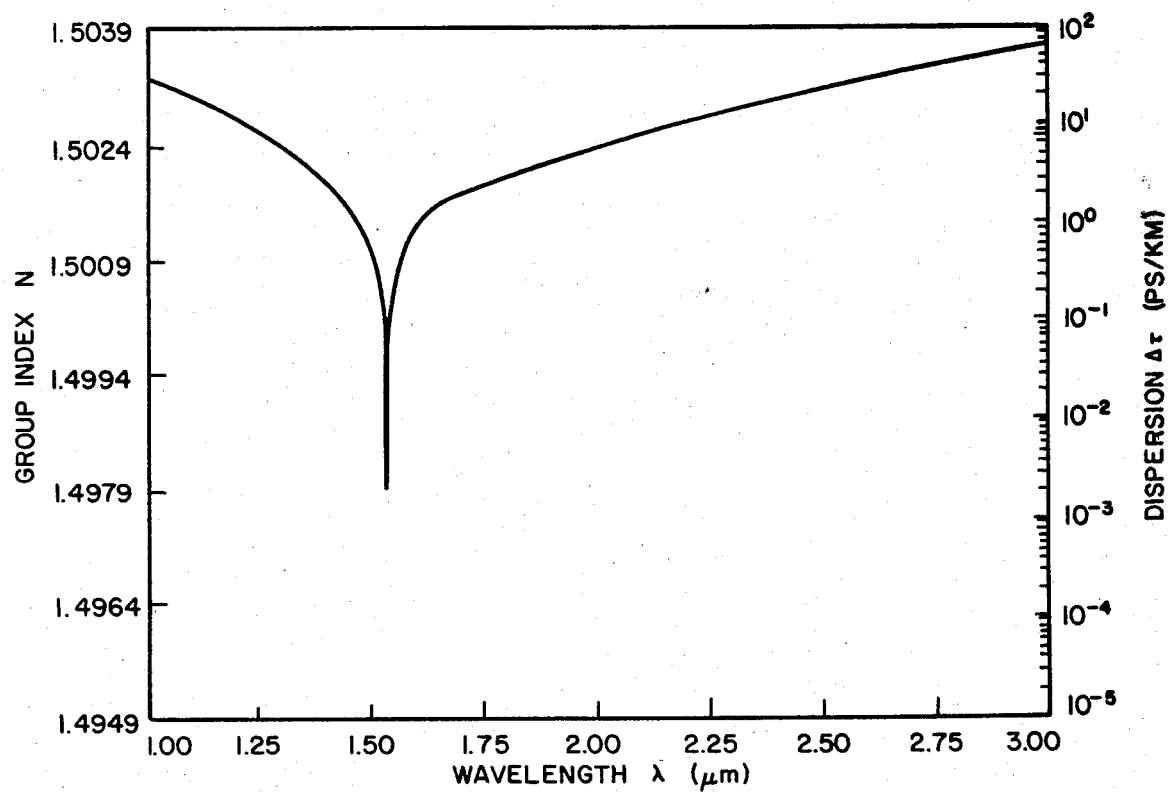
FIG. 2

TRIPLE MINIMUM DISPERSION WAVELENGTHS FOR A HIGH NA SINGLE-MODE STEP-INDEX FIBER

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

This invention is related to United States Patent and Trademark Office Application Ser. No. 202,848 by Ching T. Chang entitled "Minimum Dispersion at 1.55 $\mu$m for Single-Mode Step-Index Fibers" and now U.S. Pat. No. 4,300,930.

BACKGROUND OF THE INVENTION

The advantages of wideband data transmission over single-mode optical fibers is becoming more apparent in view of the recent development of more pure silicas which make up the cores and claddings. Freely available silica can be processed to have relatively low attenuations particularly at 1.55 $\mu$m. Recent processes have allowed the fabrication of low-loss 0.2 db-per-kilometer fibers.

The analysis of Dr. Ching T. Chang in his paper entitled "Minimum Dispersion in a Single-Mode Step-Index Optical Fiber" appearing in Applied Optics, 1979, 18, pages 2516-2522 concerned itself with the cancellation between the material and waveguide dispersions to predict a shift in the minimum dispersion wavelengths $\lambda_o$ for achieving total minimum dispersion in single-mode step-index fibers. The paper dealt extensively with various single-mode step-index fibers and predicted minimum dispersion wavelengths to achieve zero first order dispersion accurately. By solving the $LP_{01}$ mode characteristic equation, Dr. Chang could calculate accurately how much of the $LP_{01}$ mode of waveguide dispersion was needed for cancellation of the material dispersion. This greater accuracy in waveguide dispersion was found to result in a significant change in the minimum dispersion wavelength and second order residual dispersion; however, a further analysis set forth in the above referenced pending patent application provided fabricators the necessary information for making minimum loss and minimum dispersion single-mode step-index fibers at the single 1.55 $\mu$m wavelength.

From all indications, single-mode fibers are being more widely used where increasing amounts of data must be handled. Although the data carrying capabilities of such fibers is considerable, with increasing data carrying demands, the data carrying capabilities of the fibers should be increased themselves.

Thus there is a continuing need of the state-of-the-art to develop multichannel single-mode fibers having the capability of transmitting vast amounts of data over a long distance.

SUMMARY OF THE INVENTION

The present invention is directed to providing a method of fabricating a step-index single-mode optical fiber that provides minimum total dispersion at more than one wavelength by cancellation between the material and waveguide dispersions. First there is the providing of a core material and a cladding material having a refractive index difference in excess of 2.5% but less than 4.0% and dimensioning the core to have a diameter 2a so that $dN/d\lambda=0$, where N is the group index including both material dispersion and waveguide dispersion; $n_o$ is the cladding phase index and $N_o$ is the corresponding group index; b is the normalized propagation constant; V is the normalized frequency; and $\lambda$ is the wavelength; in accordance with $$\frac{dN}{d\lambda} = -\lambda \frac{d^2 n_o}{d\lambda^2}\left[1 + \Delta \frac{d(bV)}{dV}\right] - \pi a\left(\frac{N_o}{\lambda}\right)^2 (2\Delta)^{1.5} \frac{d^2(bV)}{dV^2}$$

More specifically, the method of the invention calls for the fabrication of a step-index single-mode optical fiber providing minimum total dispersion at 1.436 $\mu$m, 1.655 $\mu$m and 2.343 $\mu$m in which $\Delta=3.0\%$ and $2a=3.290$ $\mu$m. An alternate design calls for the three minimum dispersion wavelengths 1.3 $\mu$m, 1.55 $\mu$m and 2.768 $\mu$m with $\Delta$ equalling 3.85% and 2a equalling 3.019 $\mu$m. Since the optical fiber attenuations are minimized at 1.3 $\mu$m and 1.55 $\mu$m, this latter fiber, fiber D, is an ideal transmission line for wideband long-distance duplex communications.

It is a prime object of the invention to improve the transmission characterisics of single-mode step-index fiber to include a multiplexing capability for wideband long-distance communication.

Another object of the invention is to provide an increased data carrying capability for a single-mode step-index fiber having a core diameter dimensioned to effect a cancellation between material and waveguide dispersions.

Yet another object is to provide a single-mode step-indexfiber fashioned from a core material and a cladding material which produces a given difference in refractive indexes.

Still another object is to provide a high data capacity single-mode step-index fiber having wavelength duplex data carrying capabilities that assure the cancellation of material and waveguide dispersions to assure longer range transmissions.

Yet another object is to provide a method of fabricating a single-mode step-index fiber for assuring increased data carrying capabilities over duplex communication channels.

These and other objects, advantages and novel features of the invention will become apparent from the following detailed description of the invention when considered in conjunction with the accompanying drawings.

BRIEF DESCRIPTION OF THE DRAWINGS

FIG. 1 sets forth the properties for step-index single-mode fibers A, B, C and D.

FIG. 2 depicts group index N and dispersion $\Delta\tau$ as a function of $\lambda$ for the quenched silicon dioxide single-mode step-index fiber A listed in FIG. 1. The calculated $\Delta\tau$ is based on a source spectral width $\Delta\lambda=1$ nanometer.

FIG. 3 shows group index N and dispersion $\Delta\tau$ as a function $\lambda$ for the quenched silicon dioxide single-mode step-index fiber B listed in FIG. 1. The calculation $\Delta\tau$ is based on a source spectral width $\Delta\lambda=1$ nanometer.

DESCRIPTION OF THE PREFERRED EMBODIMENT

Figure 4:
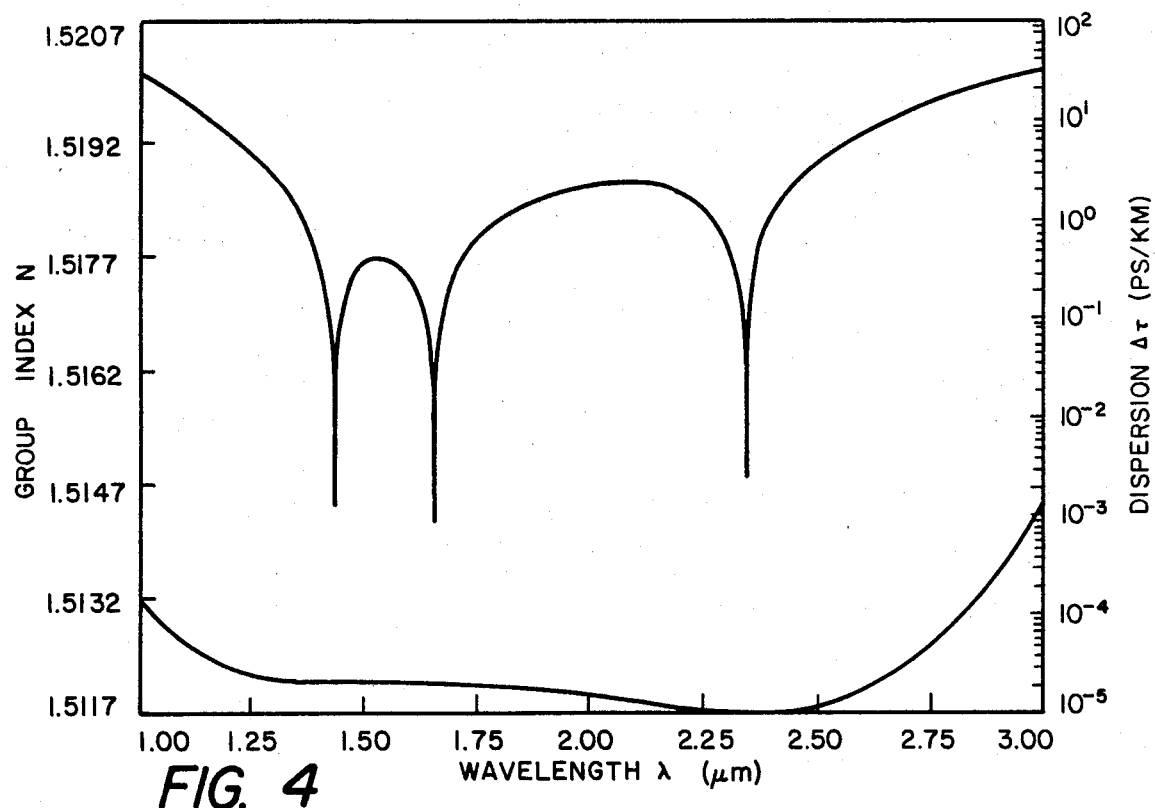
FIG. 4 shows group index N and dispersion $\Delta\tau$ as a function of $\lambda$ for the quenched silicon dioxide single-mode step-index fiber C listed in FIG. 1. The calculation $\Delta\tau$ is based on a source spectral width $\Delta\lambda=1$ nanometer.

This inventive concept evolved from a more thorough understanding of the properties of single-mode step-index optical fibers. Dr. C. T. Chang in his article entitled "Minimum Dispersion in a Single-Mode Step-Index Optical Fiber" as it appears in Applied Optics, Vol. 18, page 2516, July 15, 1979 and "Minimum Dispersion at 1.55 $\mu$m for Singe-Mode Step-Index Fibers" in Electronics Letters 8th Nov. 1979, Vol. 15, No. 23, pages 765–767 has analyzed the cancellation between the material and waveguide dispersions for single-mode step-index fibers. The results for the low numerical aperture fibers with relative index difference $\Delta$ being less than 2.5% and the normalized frequency V being less than 1.15 being less than 3.0 are twofold: the minimum dispersion wavelength $\lambda_o$ increases and the second order residual dispersion T decreases from the corresponding quantities calculated by considering the material dispersion only.

The present inventive concept deals with an extension of the analysis which is made to the high numerical aperture single-mode step-index fibers in which the relative index difference between the core and cladding is less than 4% but greater than 2%. Three minimum dispersion wavelengths for any fiber with an index difference $\Delta$ being greater than 2.5% are inherent. A fiber with a $\Delta=3.85\%$ and a core diameter $2a=3.02$ microns has the total dispersion minimized both at $\lambda_o=1.3$ microns and 1.55 microns where the fiber attenuations are minimized. The dispersion over the spectral range 1.27 microns to 1.61 microns is less than 1 ps/(kilometer nanometer), which is similar to a doubly clad optical fiber proposed by K. Okamoto et al in their article entitled "Dispersion Minimization in Single-Mode Fibers over a Wide Spectral Range" in Electronics Letters, 15, pages 729–731 (1979).

The group index N, including material and waveguide dispersions for a single-mode step-index fiber is $$N = N_o\left(1 + \Delta \frac{d(bV)}{dV}\right),$$

where $N_o$ is the cladding material group index and b is the normalized propagation constant defined in the first Chang article identified above. The pulse dispersion with the source wavelength spreading symmetrically around $\lambda$ between $\lambda_o-(\lambda/2)$ and $\lambda_o+(\lambda/2)$ is $$\Delta\tau = \begin{cases} \left|\frac{1}{c}\frac{dN}{d\lambda}\Delta\lambda\right| & \text{for } \lambda \neq \lambda_o \\ T(\Delta\lambda)^2 \equiv \left|\frac{1}{8c}\frac{d^2N}{d\lambda^2}(\Delta\lambda)^2\right| & \text{for } \lambda = \lambda_o. \end{cases}$$

Here $\lambda_o$ is the minimum dispersion wavelength where $(dN/d\lambda)|\lambda_o=0$ and $$T \equiv \left|\frac{1}{8c}\frac{d^2N}{d\lambda^2}\right|$$

is the residual second order dispersion evaluated at $\lambda_o$.

The material dispersion is calculated from the quenched silicon dioxide equation identified by J. W. Fleming in his article entitled "Material Dispersion in Light Guide Glass," Electronics Letters, 14, pages 326–328 (1978) with the assumption $d\Delta/d\lambda=0$. The waveguide dispersion is obtained by the accurate solution of the $LP_{01}$ mode characteristic equation.

Parameters of four step-index fibers identified as fibers A, B, C and D are listed in FIG. 1. Following the same calculation procedures outlined in the first Chang article the graphs FIGS. 2, 3, 4 and 5 were arrived at which show the group index N and the pulse dispersion as a function of a wavelength for each of the four fibers. The spectral widths $\Delta\lambda=1$ nanometer is used to evaluate the dispersion. Note that there is only one minimum dispersion wavelength $\lambda_o$ for either fiber A, or fiber B with $\Delta$ being $\leq 2.5\%$. Also note that the fibers C and D with $\Delta$ being $>2.5\%$ there are three minimum dispersion wavelengths, $\lambda_o$. This is because the N vs $\lambda$ curve has the tilted W-shape which has one maximum and two minimums.

The relative index difference shown in FIG. 1 is $\Delta<4\%$ because $\Delta$ being $>4\%$ are technologically difficult. With a $\Delta$ increases from 2% to 2.5% $\lambda_o$ increases and T decreases (see FIGS. 2 and 3 as well as FIG. 1). This is largely because more cancellation between material and waveguide dispersions with larger $\Delta$ (but not exceeding 2.5%) causes the U-shaped N vs $\lambda$ curve to be more flattened at longer wavelength $\lambda_o$s.

From the analysis and equations set forth in the first Chang article and an article by D. Gloge entitled "Weakly Guiding Fibers," Applied Optics, 10, pages 2252–2258, (1971) the dependence of N on V can be seen from the following equation:

$$N = \begin{cases} N_o & V << 3.0 \\ N_o(1 + 1.143\Delta) & V = 3.0 \\ N_o(1 + \Delta) & V >> 3 \end{cases}$$

The group index N is maximized at $V=3.0$ with $N_{max}=N_o(1.143\Delta)$, which is larger than the core material group index $N_o(1+\Delta)$. This means the effect of waveguiding will slow down the group velocity through a single-mode step-index fiber. This effect is most pronounced at $V=3.0$ and is decreased both at V is much, much less than 3.0 and V is much, much greater than 3.0. With V being much, much less than 3.0, the optical power is predominantly unguided in the cladding and thus N is equal to the cladding material group index $N_o$. At V is much, much greater than 3.0, the $LP_{01}$ mode propagating in the weakly guiding fiber is similar to a quasi plane wave in the fiber core which has a diameter 2a is much, much greater than λ. Waveguiding has no effect on this quasi plane wave and thus inapproaches the core material group index $N_o(1+\Delta)$.

Figure 5:
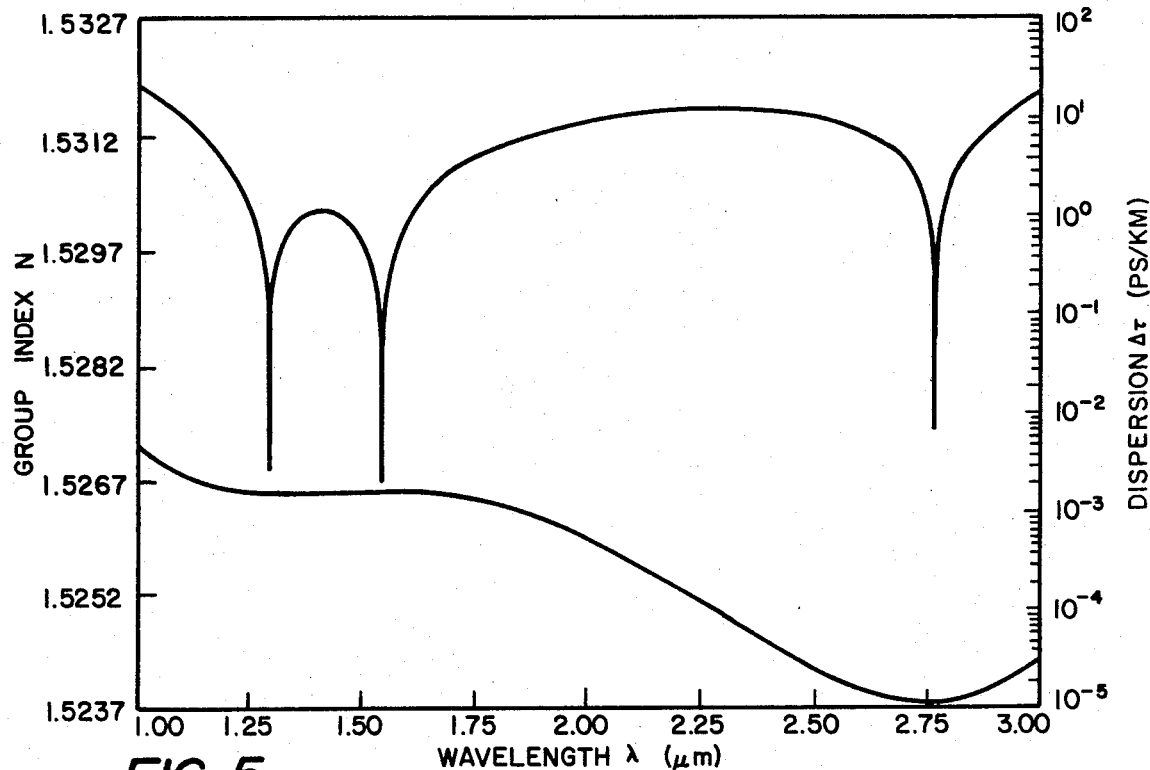
FIG. 5 depicts the group index N and dispersion $\Delta\tau$ as a function of $\lambda$ for the quenched silicon dioxide single-mode step-index fiber D listed in FIG. 1. The calculation $\Delta\tau$ is based on a source spectral width $\Delta\tau=1$ nanometer.

In the case of the relative index difference between the cladding and the core Δ greater than 2.5% with more waveguiding effect, the combination of N being $>N_o(1+\Delta)$ and the U-shaped $N_o$ vs λ curve produces the W-shaped N vs λ curve. This curve has one maximum and two minimum. As shown in FIGS. 4 and 5 there are three minimum dispersion wavelengths $\lambda_o$ corresponding to the vanishing of the absolute value of $(dN/d\lambda)=0$. By choosing the core diameter 2a=3.02 microns and λ=3.85% (the fiber D shown in FIG. 1) two of the minimum dispersion wavelengths are found to be $\lambda_o=1.3$ microns (at V=2.92) and $\lambda_o=1.55$ microns (at V=2.45), where the fiber losses are minimized.

The doubly clad fiber proposed in the article by K. Okamoto above, has its dispersion less than 1 ps/(kilometer nanometer) over the spectral range 1.35 microns to 1.67 microns. In comparison the fiber D identified in FIG. 1 and depicted in FIG. 4 has the dispersion of less than 1 ps/(kilometer nanometer) over the wavelength 1.27 to 1.61 microns. The high numerical aperture fiber of fiber D operated in a quasi single-mode will be useful for wavelength division multiplexing and long-distance high bandwidth communications through a single fiber. However, it must be kept in mind that the high doping required to create a relatively large Δ (in this case Δ=3.85) cannot introduce too much Rayleigh scattering.

Figure 6:
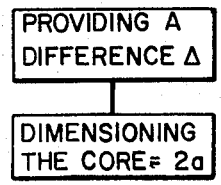
FIG. 6 depicts the block diagram form of the method of this invention.

Looking to FIG. 6 of the drawings the inventive concept calls for their providing a relative index difference Δ between the cladding and core of the single-mode fiber of not greater than 4% and preferably in excess of 2.5% and the dimensioning of the core to have a diameter 2a so that the minimum dispersion wavelengths will be created.

The material of the core, silica dioxide, can be doped with germanium dioxide so as to create the identified index difference between the core and cladding. There are many different techniques for producing fibers having the proper amount of doping agents to establish wanted refractive indices. A highly satisfactory method is the modified vapor deposition method of fabricating high silica fibers. This and related manufacturing techniques are thoroughly disclosed in *Optical Fiber Telecommunication* by Stuart E. Miller and Allen G. Chynoweth, Academic Press, New York, 1979. Another article sets forth an example of single-mode fibers having different core diameters and refractive indexes and is by T. Miya et al entitled "Ultimate Low-Loss Single-Mode Fiber at 1.55 μm" (Electronic Letters, 15, pages 106–108)(1979).

Drawing the fibers as they cool produces the desired core diameters typically, cores in single-mode fibers are in the neighborhood of 4–5 μm, the telecommunication publication referred to above lends itself to several techniques for forming fibers having desired dimensions.

Obviously many modifications and variations of the present invention are possible in the light of the above teachings. It is therefore to be understood that within the scope of the appended claims the invention may be practiced otherwise than as specifically described.

What is claimed is:

1. A method of fabricating a step-index single-mode optical fiber that provides minimum total dispersion at three wavelengths by cancellation between material and waveguide dispersions comprising:

providing a core material and a cladding material having a refractive index difference 4% > Δ > 2.5% and dimensioning the core to have a diameter 2a so that $(dN/d\lambda)=0$ in accordance with $$\frac{dN}{d\lambda} = -\lambda \frac{d^2 n_o}{d\lambda^2}\left[1 + \Delta \frac{d(bV)}{dV}\right] - \pi a \left(\frac{N_o}{\lambda}\right)^2 (2\Delta)^{1.5} \frac{d^2(bV)}{dV^2}$$

where N is the group index of refraction including the sum of the material dispersion and the waveguide dispersion; $n_o$ is the cladding phase index; b is the normalized propagation constant; No is the group index of refraction including material dispersion only; V is the normalized $$\text{frequency} = \pi\left(\frac{2a}{\lambda}\right) n_o \sqrt{2\Delta}.$$

2. A method according to claim 1 in which the three wavelengths are 1.436 μm, 1.655 μm and 2.343 μm and Δ=3.0% and 2a=3.290 μm.

3. A method according to claim 1 in which the three wavelengths are 1.30 μm, 1.55 μm and 2.768 μm and Δ=3.85% and 2a=3.019 μm.

* * * * *